United States Patent [19]
Goodwin

[11] 3,777,752
[45] Dec. 11, 1973

[54] CHICK PROCESSING AND HANDLING DEVICE

[76] Inventor: Ray Goodwin, 124 N. King Charles Rd., Raleigh, N.C. 27610

[22] Filed: Apr. 3, 1972

[21] Appl. No.: 240,593

[52] U.S. Cl. ............................................... 128/173
[51] Int. Cl. ........................................... A61m 11/00
[58] Field of Search ..................... 128/173, 172, 223, 128/253, 303.1, 303.13, 303.14, 305; 209/122, 123, 124; 198/209, 45, 19; 193/43 D, 2

[56] References Cited
UNITED STATES PATENTS

| | | | |
|---|---|---|---|
| 1,125,237 | 1/1915 | Whittier | 209/123 |
| 1,288,375 | 12/1918 | Bickley | 209/124 |
| 1,854,850 | 4/1932 | Linkenauger | 198/209 UX |
| 2,535,648 | 12/1950 | Mills | 193/43 D |
| 3,704,688 | 12/1972 | Wilson | 128/253 X |

FOREIGN PATENTS OR APPLICATIONS 679,627   12/1964   Italy ................................ 128/173 R Primary Examiner—William E. Kamm
Assistant Examiner—Lee S. Cohen
Attorney—Ralph E. Parker et al.

[57] ABSTRACT

An improved apparatus for processing baby chicks so that they may receive necessary preliminary treatment before packaging in such manner as to reduce the amount of handling to improve the efficiency of operation and to minimize injury to the chicks. The apparatus comprises an annular conveyor and a belt conveyor connected by a chute means. As the chicks pass along conveyors, they are debeaked and vaccinated.

6 Claims, 2 Drawing Figures

PATENTED DEC 11 1973  3,777,752

CHICK PROCESSING AND HANDLING DEVICE

In the usual operation, newly hatched chicks are removed from the incubator and collected in containers, the containers are carried to a station where the chicks are debeaked, the chicks are then collected in containers which might be those previously mentioned, the containers are then carried to another station where the chicks might be vaccinated, the chicks are then again collected in containers which again might be those previously mentioned and taken to yet another station where the chicks might be graded and counted into 100-size chick boxes. In such operation, the chicks are handled many times requiring a large amount of manual operation and it is apparent that an arrangement which reduces the amount of manual operation will not only produce more efficient and economical operation but also tend to reduce the amount of unjury suffered by the chicks.

It is therefore an object of this invention to provide an improved device for processing chicks.

A further object of this invention is to provide an improved device for processing chicks wherein the chicks are carried from one processing station to another with a minimum of disturbance to the chicks.

Further objects, features and advantages of this invention will become apparent from the following description when taken in conjunction with the accompanying drawings in which.

Figure 1:
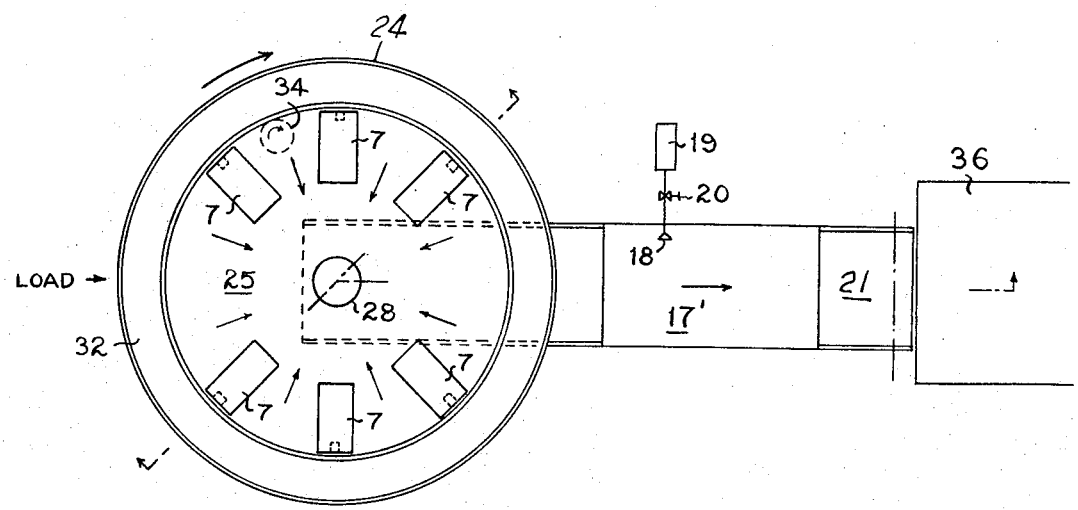
FIG. 1 is a top plan view of the apparatus.
Figure 2:
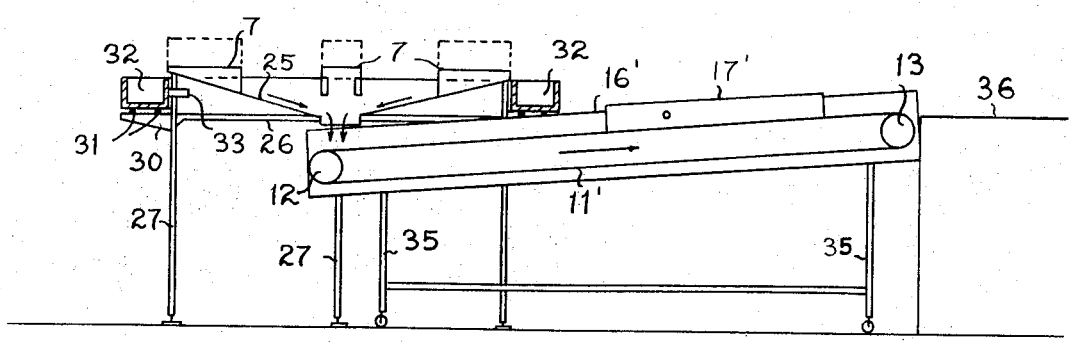
FIG. 2 is a composite cross-sectional view composed of cross-section A—A, showing the rotating conveyor means and cross-section A—B showing the off-feed conveyor and vaccination booth, of the apparatus shown in FIG. 1.

The chick processing device of this invention illustrated in FIGS. 1 and 2, comprises an operating table assembly 24, composed of an off-feed chute 25, bracing members 26 and leg members 27 providing a debeaking station. Off-feed chute 25 slopes, at an angle of about 15° from the horizontal, toward a central opening 28 which directly overlies the load-receiving end of the conveyor belt 11'. Opening 28 has an area large enough to freely pass a chick.

Off-feed chute 25 supports a plurality (six being indicated in FIG. 1) of debeaking mechanisms of the Lyon type, 7, 7, spaced about the periphery of the conical chute 25.

Extending from the operating table assembly 24 are a plurality of spaced support arms 30 on which an annular rotating conveyor trough 32 rotates by way of bearing members 31, 31 fixed to upper surfaces of the support arms. Trough 32 is caused to rotate by means of a resilient drive wheel 33 fixed to the output shaft of an electric motor 34 supported on the assembly. In its preferred embodiment said trough is formed from fiberglass surfaced with an imperforate layer of water-insoluble plastic. In one specific embodiment the side walls of the trough were about six inches high and the horizontal dimension from wall to wall was about eight inches. The outside diameter of the annulus was 72 inches, while the diameter of the chute was 54 inches.

Off-feed conveyor belt 11' supported between rollers 12 and 13 is disposed in conveyor chute 16' which latter is in turn supported on leg members 35, 35. An area along the travel of the belt is totally enclosed as shown at 17' to provide a sealed chamber into which an atomized vaccine may be sprayed by means of spray nozzle 18 to which vaccine and compressed air are supplied from source 19 under the control of valve 20. The exit end of belt 11' overlies the storage box 21. The conveyor chute is desirably movable, and hence can be supported on castors for placement where desired. In use it extends beneath opening 28 sloping upwardly to a delivery point adjacent counting table 36.

A brief description of the apparatus illustrated in FIGS. 1 and 2 is as follows:

The chicks are delivered to the operating table assembly 24 at the point marked "LOAD," and they ride in the rotating conveyor trough until they are picked up by one of the operators (six, more or less), at debeaking stations 7, 7, who then debeak the chicks (two at a time) by means of a Lyon-type debeaker mechanism. The operators then drop the chicks onto the off-feed chute 25 (the chute having a 15° slope downward to the center opening 28), and the chicks slide down the chute to the latter opening. The chicks drop through opening 28 onto the off-feed conveyor belt 11' which carries the chicks in the direction of arrow into the enclosed chamber 17' where the chicks can be vaccinated for Newcastle and/or Bronchitis diseases by atomized vaccine which is sprayed into the chamber 17' by nozzle 18 which is supplied with vaccine and compressed air from source 19 under the control of valve 20. After passing through booth 17' the chicks are delivered by the conveyor to counting table 36, where they are counted into boxes of 100.

The man-power requirements and job descriptions, re the FIGS. 1 and 2 embodiment, are as follows:

a. One operator who loads the chicks onto the rotating conveyor trough.

b. Six (more or less) operators who pick up the chicks, two at a time, debeak the chicks, and then place the chicks onto the off-feed chute.

c. One or more operators who grade and count the chicks into boxes in 100 size lots.

While there have been shown and described the preferred forms of embodiment of my invention, it will be apparent that various changes and modifications may be made therein without departing from the spirit of the invention as set forth in the appended claims.

I claim:

1. A chick handling and processing device comprising
a rotary conveyor having an annular trough-shaped member at its circumference;
means for moving said rotary conveyor in one direction along a horizontal circular path;
said annular trough-shaped member being designed to carry chicks along said circular path;
a plurality of first positions along said circular path for processing chicks placed in said annular trough-shaped member;
means located at each of said first position for performing a first operation on each of said chicks;
a downwardly extending chute means within the bounds of the circular path aforesaid said chute means having an outlet opening at its apex and accessible to all of said first positions, onto which chute means the chicks which have been removed from said annular trough-shaped member and operated on at one of said first positions are placed;
a traveling belt conveyor, having a receiving end and a discharge end, and with its receiving end underlying said outlet opening, said conveyor receiving chicks as they move by gravity off of said chute means;

a second position along the path of said belt conveyor;

means for performing a second operation on each of said chicks as the chick is carried past said second position; and collection means for said chicks at the discharge end of said traveling belt conveyor.

2. A chick handling and processing device as described in claim 1, wherein the first operation means located at said first position is a debeaker for removing a portion of the beaks of said chicks so that they are less able to injure one another.

3. A chick handling and processing device as described in claim 2, wherein the second operation means located at said second position is a vaccinating means for vaccinating each of said chicks against such diseases as Newcastle and/or Bronchitis diseases.

4. A chick handling and processing device as described in claim 3, wherein the vaccinating means comprises an enclosure into which the chicks pass due to the movement of said belt conveyor, said enclosure being provided with top and side walls and entry and exit curtains for the belt conveyor to maintain a sealed atmosphere within the enclosure, and with means for spraying an atomized vaccine into said atmosphere so that each chick is wholly exposed to said atomized vaccine and receives the benefits thereof.

5. A chick handling and processing device as described in claim 1, wherein said downwardly extending chute means is in the form of a disc downwardly sloping toward an exit opening in the center of the disc, and wherein said annular trough-shaped member surrounds the periphery of said disc.

6. A chick handling and processing device as described in claim 5, wherein the means located at said first positions comprises a plurality of debeaker units, spaced about said disc, for removing portions of the beaks of said chicks.

* * * * *